TIME REQUIRED TO INITIATE COAGULATION OF LIQUID WHOLE EGGS AT DIFFERENT TEMPERATURES AND DILUTIONS

TIME REQUIRED TO COAGULATE HUMAN PLASMA (DOTTED) AND ANTI-HOG CHOLERA SERUM (SOLID) AT DIFFERENT TEMPERATURES AND DILUTIONS

United States Patent Office 3,579,631
Patented May 18, 1971

3,579,631
STERILIZATION OF MATERIALS CONTAINING PROTEIN
Aubrey P. Stewart, Jr., 801 Grove Ave.; Clarence R. Dreier, Jr., 1101 Nodaway St.; and Jim C. Gregory, 17th and Grove St., all of Corning, Iowa 50841
Filed May 21, 1968, Ser. No. 730,854
Int. Cl. A61k 23/02
U.S. Cl. 424—86                                   5 Claims

ABSTRACT OF THE DISCLOSURE

A process for sterilizing heat-sensitive materials in which the protein coagulates at high temperature, said process including dilution of the material followed by high temperature short time sterilization thereof, without said protein coagulating.

Figure 1:
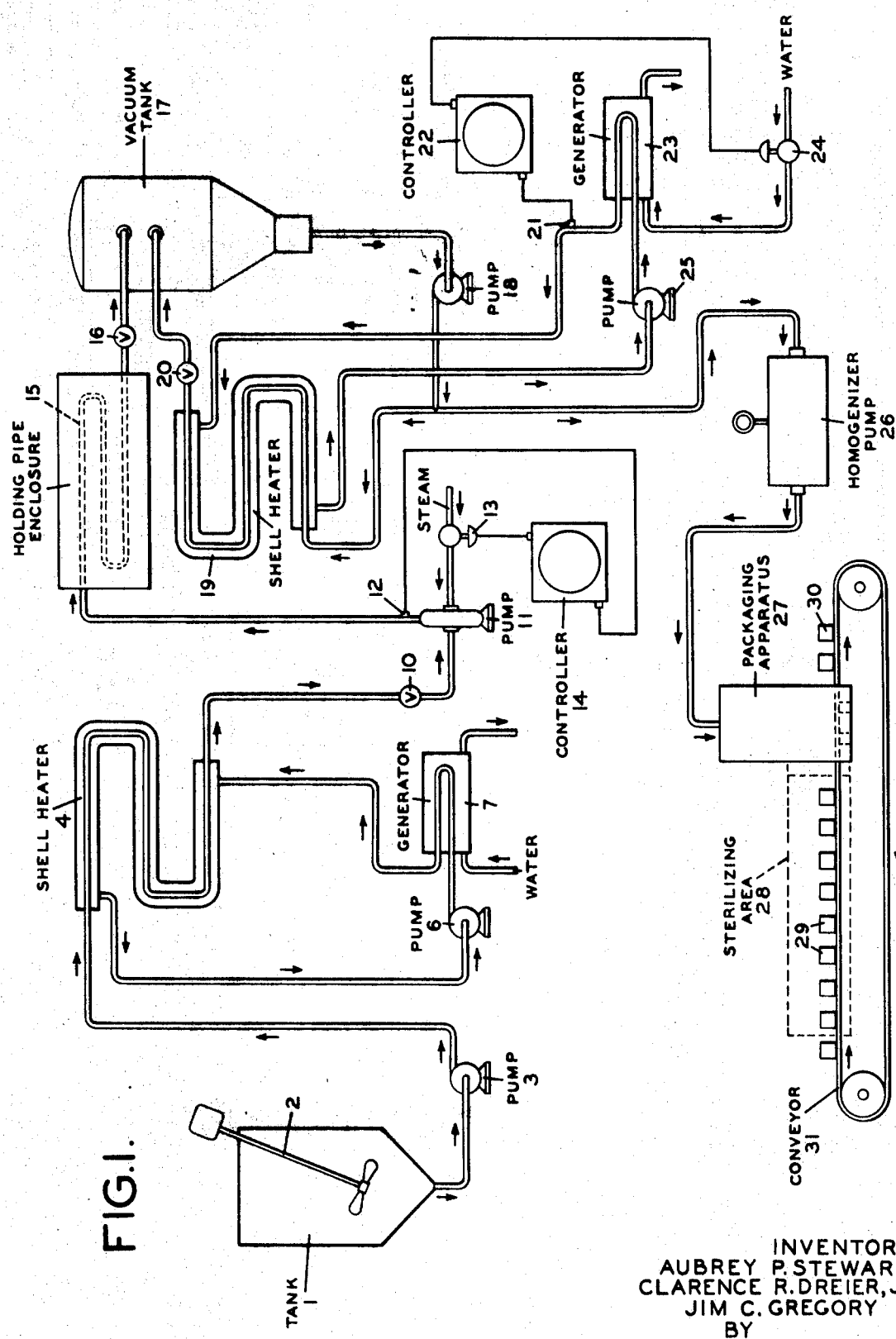

This invention relates to the processing of protein carrying materials and particularly high protein content materials which are characterized as coagulable when subjected to heat. Examples of such materials are foods, such as eggs, and biological fluids such as blood plasma or blood serum.

Egg whites for example, cannot be heated over a temperature of approximately 142° F. without denaturing the albumen. Egg yolks, per se, are more stable but even they can withstand temperatures only up to about 165° F. The whole egg pasteurizing process usually takes place at 142° F. with a holding time of 3 or 4 minutes or 160° F. for 15 seconds. The temperature limitations just indicated, however, are a problem since pasteurizing conditions at such temperature levels may not be completely effective in destroying Salmonella bacteria, without heat damage to the protein. Yet, it is of great importance to destroy these bacteria, since such is the cause of salmonellosis in human beings, especially children.

In the same manner as discussed above in relation to eggs and whole eggs, it is highly advantageous to be able to sterilize whole blood plasma or blood serum, a high protein material (containing albumen) or protein derivatives, including amino acids, or like materials which is sensitive to high temperature because of breakdown of the proteins.

U.S. Pat. 3,166,424 to R. A. Stewart et al., discloses one method of sterilizing egg yolks. In said patent egg yolk or yolk and white mixtures are treated by slurring the egg in a liquid such as water and flash sterilizing the mixture with steam for a period of time to deliberately coagulate egg protein. The egg product is then aseptically canned and retorted at an elevated temperature for a period necessary to obtain the desired consistency.

The patent to Hawk 2,766,126 discloses a process for the production of canned egg puree. The egg yolk is slurried in a liquid such as water and then heated to an elevated temperature, but a temperature insufficient to sterilize, in order to partially coagulate the protein. The minor proportion of uncoagulated protein serves to later form a gel structure to hold the previously coagulated major proportion of protein intact when the product is finally sterilized.

The Stewart et al. patent first discussed above is similar to the Hawk patent except that partial coagulation of protein is carried out at a temperature which sterilizes the product and then, after aseptic canning, the can and contents are subjected to a final heat treatment, which can be less than sterilization conditions, to complete the coagulation and obtain a custard consistency. The Hawk and Stewart patents, then, both describe treatments which deliberately coagulate egg protein and the desired result is a completely coagulated egg product of custard consistency. Neither patent describes a sterilization process wherein a sterile product results with a major part of the protein in uncoagulated form.

Sterilized egg products, whole eggs, blood plasma or blood serum, or other like high protein or protein constituent matter, as described previously, has the advantage of preservation and later use without danger of microbiological growth and contamination. Therefore, sterilization of materials in the manner as described hereinafter with relation to our invention is especially desirable and preferred.

Briefly stated the present invention involves short-time, high-temperature sterilization of liquid of high protein content as a result of dilution with water, sterilization at a high temperature for a short period of time (dilution, time and temperature being interrelated so that sterilization occurs without substantial protein coagulation), and then evaporation of the water under low heat aseptic conditions. The resulting sterile liquid material, without substantial protein denaturization, is thus accomplished.

Figure 2:
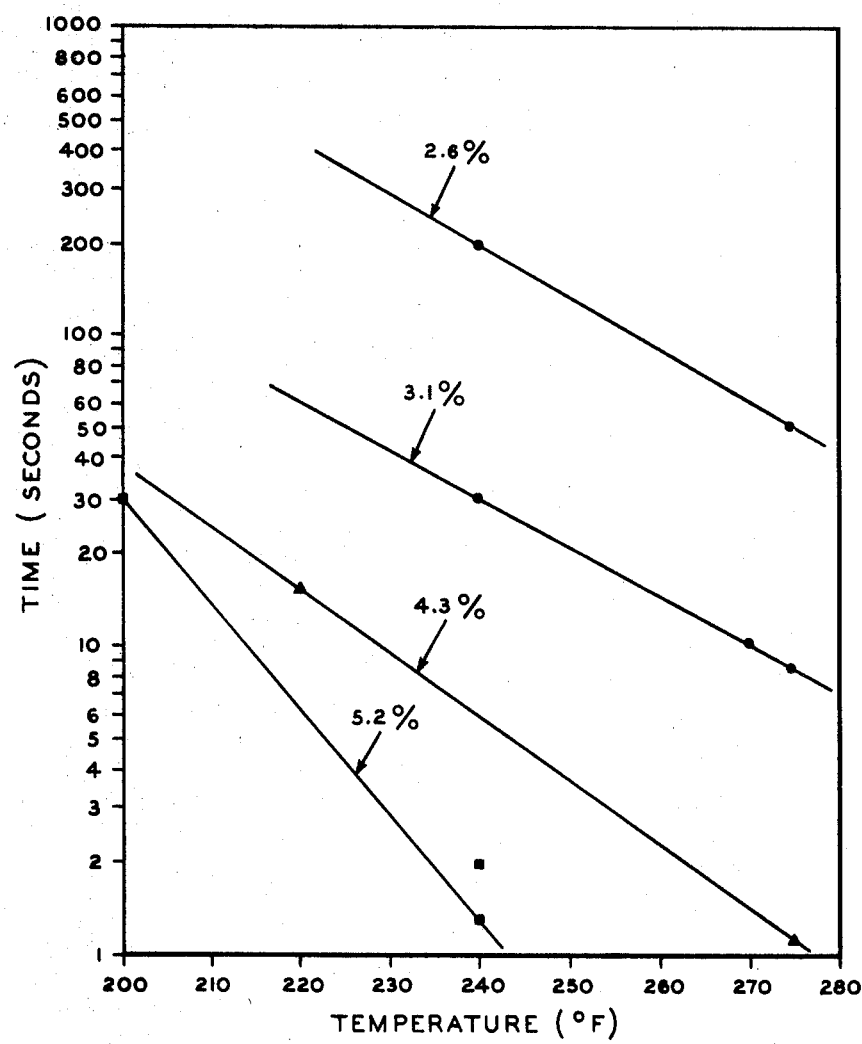
Figure 3:
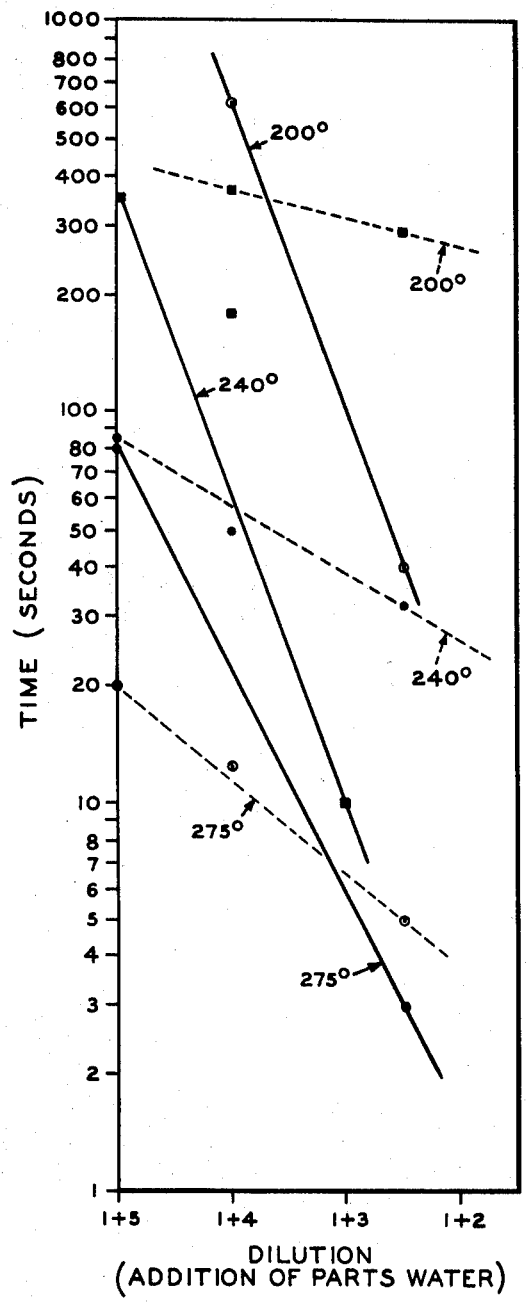

Our invention will now be described in more detail with relation to the following drawings and examples. FIG. 1 shows a schematic illustration of a sterilizing process according to our invention; and FIGS. 2 and 3 are plots of test results obtained, as described further hereafter.

EXAMPLE 1

60 pounds liquid whole eggs were mixed with 30 pounds of whole milk, 430 pounds water and 1.2 pounds sodium citrate. The egg solids content of the mixture was 3% as compared with 26% egg solids in liquid eggs and 21.5% total solids in the egg-milk mixture before mixing with water. Referring to FIG. 1, which is illustrative of apparatus to carry out the invention, the diluted mixture in tank 1 stirred with agitator 2 was pumped 3 through a tube and shell heater 4 supplied with a hot water through recirculating pump 6 and generator 7 which raised the temperature of the liquid from 40° F. to 135° F. Product flow rate was one gallon per minute. The 135° F. product was then steam injection heated by a steam injection pump 11 controlled by check valve 10. Temperature was controlled at 272° C. by an instrument control system (shown schematically as sensor 12, controller 14, and valve 13) on the steam supply line to the steam injection pump. The 272° F. liquid egg was passed for about 19 seconds through holding pipe 15 with back pressure maintained thereon by valve 16 and then into vacuum tank 17 operated at a sufficient vacuum to cause evaporation, that is 19 inches mercury vacuum in this case. Removal pump 18 recirculated the then 76° F. cooled product from the the vacuum tank at a rate of 16 gallons per minute through tube-in-shall heater 19 where the temperature was raised to 135° F. by hot water circulating on the outside tube surrounding the product tube. Flow rate was controlled by valve 20 and the 135° F. product cycled back into the vacuum tank 17. Through the procedure, water was removed from the product until a total solids concentration of 21.5% was reached, which was the solids content of milk plus eggs in the original mixture before dilution with water. The 135° F. recirculation temperature was maintained by control instrument 21, 22 (sensor-controller) regulating hot water generator 23, supplied by valve and using recirculating pump 24, 25. At this point the 21.5% solids product was drawn off at a rate of 0.17 gallon per minute by homogenizer pump 26 operating on the recirculating line from pump 18 and the 76° F. product aseptically packaged, for example in cans 29 moving on conveyor belt 31 through sterilizing area 28 and packaging apparatus 27, all of well known description. Since the egg is sterilized, it may be aseptically packaged, since no growth within the package can occur. For reasons of health such combination of aseptic packaging with the sterilization discussed is not only acceptable, therefor, but preferable. The system was in equilibrium with these conditions and at a feed rate of diluted product of one g.p.m. to the system and removal rate of .17 g.p.m. The 21.5% final solids concentration was maintained continuously. The final sterile product was liquid and similar in viscosity to the egg-milk mixture before dilution and sterilization. It has also been noted in addition that deaeration of the product before heat treatment results in substantial retention of color characteristics.

EXAMPLE 2

Liquid whole eggs were diluted to 2.6% total solids and the same sterilization and sterile evaporation procedure followed as in Example 1 except that the ratio of dilute product feed rate to evaporated product drawoff rate to the aseptic package was somewhat larger to allow for greater water evaporation requirements. The final product contained 26% egg solids, and was liquid and clear.

EXAMPLE 3

Human blood plasma (of the type used for transfusions and mixed in the ratio of 435 parts by volume blood plasma to 65.25 parts U.S.P., NIH solution A) was diluted from 8.73% solids to 1.7% solids and sterilized in a manner as to a temperature and time similar to that described in Example 1. No appreciable coagulation was observed.

EXAMPLE 4

Anti-hog-cholera serum, Sioux Falls brand, was diluted from 7.87% solids to 1.75% solids and found to substantially be uncoagulated after sterilization in a manner as to temperature and time similar to that described in Example 1.

In the case each of the examples given the final sterilized product was fluid and showed none to slight coagulation of protein as judged by turbidity, viscosity and centrifugation tests.

It was found that indirect heating temperature of 135° F. or lower is desirable and that temperatures over about 142° F. cause protein damage or at least initiate protein damage. Similarly, recirculation temperatures over about 142° F. produce damage to the protein and cause coagulation.

Steam injection heating must be done very efficiently and we have found the steam injection pump described in U.S. Pat. 3,182,975 to give best results. Other types of sterilizers require substantially higher dilution of protein containing liquids to prevent excessive coagulation.

FIGS. 2 and 3 show the degree of dilution of liquid whole eggs necessary to prevent more than slight coagulation of protein during heating at various temperatures (including sterilization temperature) and time combinations; that is, for any particular percent total solids after dilution in the range of about 5 to 20 to 1, certain combinations of sterilization temperature and holding time are permissible, before coagulation of the protein commences. FIGS. 2 and 3 show such maximum combination for liquid whole eggs, human plasma, and anti-hog-cholera serum (such combinations being indicated as for any particular degree of dilution).

Sterilization produces a product not capable of undergoing growth of microorganisms while held under aseptic conditions. We have discovered how to sterilize high protein products without breaking down the protein. As shown in FIG. 2 the eggs diluted to 3.1% solids may be sterilized at 275° F. for about 8 seconds without substantial breakdown of constituent protein. At lower sterilizing temperatures, greater dilution is required to maintain time constancy than at higher temperatures.

FIGS. 2 and 3 are generalized curves taken from experimental data derived from laboratory tests of dilution and effectiveness of heat treatment. Certain variations from these norms can be expected to exist due to natural variations in stability and composition of the liquid to be treated. Also, some shift in norms can be expected as a result of the addition of other stabilizing mediums such as mineral oil, or treatment with protein stabilizing chemicals such as sodium citrate and metallic ions, as well as pH adjustment. However, no stabilizing mediums, such as chemical stabilizing treatments known to the inventors, have the permitted heat sterilization of eggs, plasmas, or like materials as described herein.

It will be understood that is is intended that the scope of the invention only be limited by the following claims.

We claim:

1. Sterilized blood plasma, said plasma characterized by the fact that (1) it has been high-temperature-short time sterilized after dilution thereof, and (2) the protein constituent thereof is substantially uncoagulated.

2. Sterilized serum, said serum characterized by the fact that (1) it has been high temperature-short time sterilized after dilution thereof, and (2) the protein constituent thereof is substantially uncoagulated.

3. A process for sterilizing protein material selected from a class associated with blood consisting of blood plasma and serum, the protein of which is coaguable when subjected to temperatures above about 145° F., comprising the steps of diluting the material with water in the range of from about 5 to 20 to 1; preheating the dilute to a temperature of less than 145° F.; heating the dilute to a temperature above about 270° F. by heat exchange contact with steam, for a time sufficient for sterilization, but without coagulating the protein; and cooling the dilute.

4. A process for sterilizing material including protein constituent, said constituent coaguable when subjected to temperatures above about 145° F., comprising the steps of diluting the material with water in the range of from about 5 to 20 to 1, heating the dilute to a temperature sufficient to sterilize same while holding the heated dilute at said last mentioned temperature for a time not sufficient at said temperature to substantially coagulate said constituent, cooling the sterilized, substantially uncoagulated dilute, evaporating said water from said dilute, said material being blood plasma.

5. A process for sterilizing material including protein constituent, said constituent coaguable when subjected to temperatures above about 145° F., comprising the steps of diluting the material with water in the range of from about 5 to 20 to 1, heating the dilute to a temperature sufficient to sterilize same while holding the heated dilute at said last mentioned temperature for a time not sufficient at said temperature to substantially coagulate said constituent, cooling the sterilized, substantially uncoagulated dilute, evaporating said water from said dilute, said material being serum.

References Cited

UNITED STATES PATENTS

| | | | |
|---|---|---|---|
| 2,887,107 | 5/1959 | Wehrli | 23—258.5 |
| 2,930,705 | 3/1960 | Janak et al. | 99—161X |
| 3,113,872 | 12/1963 | Jones et al. | 99—161 |
| 3,166,424 | 1/1965 | Stewart et al. | 99—161X |
| 3,254,943 | 6/1966 | Palm | 99—216X |

FOREIGN PATENTS

| | | | |
|---|---|---|---|
| 900,808 | 7/1962 | Great Britain | 21—2 |

TIM R. MILES, Primary Examiner

U.S. Cl. X.R.

21—56, 94; 99—216; 424—101